United States Patent [19]

King

[11] 4,126,981
[45] Nov. 28, 1978

[54] SEMI-AUTOMATIC CARTON FORMING, FILLING, AND SEALING MACHINE

[75] Inventor: Percy King, Bloomington, Minn.

[73] Assignee: FBM International, Inc., Minneapolis, Minn.

[21] Appl. No.: 829,283

[22] Filed: Aug. 31, 1977

[51] Int. Cl.² .................. B65B 3/02; B65B 43/26; B65B 67/00
[52] U.S. Cl. .................................. 53/565; 53/266 R; 53/375; 53/379
[58] Field of Search ............... 53/186, 266, 375, 379, 53/39, 390, 183, 272, 276; 93/39.2, 59 R, 59 CE, 49 R, 55

[56] References Cited

U.S. PATENT DOCUMENTS

| 3,236,160 | 2/1966 | Mullaney | 53/375 X |
| 3,307,325 | 3/1967 | Garrett et al. | 53/186 |
| 3,619,979 | 11/1971 | Martensson et al. | 53/266 X |
| 3,699,743 | 10/1972 | King et al. | 53/186 |

Primary Examiner—Horace M. Culver
Attorney, Agent, or Firm—Schroeder, Siegfried, Ryan, Vidas & Steffey

[57] ABSTRACT

A semi-automatic carton forming, filling, and sealing machine utilizing a single rotationally movable mandrel for assisting the machine operator in the erection of a carton blank and for closing and sealing the bottom portion of the carton and also including a carton filling and top closing mechanism operated in coordination with the rotational mandrel.

4 Claims, 7 Drawing Figures

SEMI-AUTOMATIC CARTON FORMING, FILLING, AND SEALING MACHINE

The present invention relates to a SEMI-AUTOMATIC CARTON FORMING, FILLING, AND SEALING MACHINE and more particularly to a machine of the type which erects flattened plastic-coated carton blanks and fills and seals them. The present machine is particularly adaptable for use with cartons having thermoplastic moisture-proof coatings on the inner and outer surfaces thereof and utilizes the coatings as a heat- and pressure-sensitive adhesive in connection with its forming and sealing of the cartons.

A number of carton forming machines are in general use. In general, the prior machines are quite complex when combined into a single automatically operated unit and, if used separately, require cumbersome conveying equipment. The present invention is directed to a combined semi-automatic machine for performing the carbon forming, filling, and sealing operations under the control of a single operator who operates the machine from a central position.

The present invention provides an improved machine requiring minimal floor space and power requirements and is operable by a single operator. Because of the machine's simplicity, it is not necessary that the operator be highly skilled. Also, because of the machine's simplicity, the maintenance and conversion of the machine from one sized carton to another may be done relatively rapidly by a mechanic having a minimum of training. For these reasons, the machine is particularly useful in dairies in underdeveloped countries where the training of machine operators and maintenance personnel may be minimal.

In particular, the improved carton forming, filling, and sealing machine of the present invention is used by the operator to open the flattened carton blanks and fold the bottom flaps under before sealing to form a receptacle for the milk or other fluid to be deposited in the carton.

The operator manually places the knocked-down carton on a mandrel, breaks the bottom flaps on a score line, and activates a switch to move the mandrel into position for a predetermined period of time in a heating station to heat the bottom flaps prior to completion of the closing and sealing operations which immediately follow the heating operation without further intervention of the operator.

After the bottom seal is completed, the mandrel is returned to the initial position to permit removal of the carton by the operator and transfer of the carton to a filling position where it is to be filled. After transfer of the erected carton with the seal bottom to the filling position, a new carton is forced over the mandrel, and the bottom sealing operation is again initiated by an operator-controlled switch. The filling and top sealing process is also operated in coordination with the bottom closing and sealing process. The carton is filled with milk or other liquid, moved to a top heating area to precondition the top seal and then is moved to a closing and sealing station where the top is closed and finally sealed. The filled and sealed carton is then returned to the initial filling position for removal by the operator and replacement with an erected carton with a sealed bottom closure.

In order to simplify the activities of the operator and optimize the operating speed of the machine, the carton erecting and bottom sealing operations are performed in synchronism with the liquid filling and top sealing operations. As a first carton is being filled in the fill position, the next carton is being opened by the operator over the mandrel. When the operator actuates the switch, the filled carton has its top seal area heated while the next carton has its bottom seal area heated. The machine, after a predetermined heating time, then advances the filled carton for top sealing and the erected carton for the bottom sealing operation. Both the filled, sealed carton and the erected carton are then returned to the central operator position for the next operator steps of removal of the filled, sealed carton and transfer to a container or further conveying apparatus, transfer of the erected carton to the filling position, and finally the opening of the next carton blank on the mandrel preparatory to bottom sealing.

This machine permits a combination of forming, filling, and sealing apparatus with a minimum of space requirements providing trouble-free operation by a single, relatively unskilled operator.

It is, therefore, an object of this invention to provide an improved carton forming, filling, and sealing machine.

Another object of this invention is to provide a carton forming machine which performs the bottom heating and sealing operations and coordination with the top heating and sealing operations.

A further object of this invention is to provide an improved carton heating mechanism for efficiently melting the thermoplastic coating of the carton for pressure sealing.

A further object of this invention is to provide, in a carton sealing machine, a simplified flap-folding device for folding the bottom flaps prior to application of sealing pressure.

A further object of this invention is to provide, in a carton forming, filling, and sealing machine, a simplified synchronization system for ensuring simultaneous performance of forming, filling, and sealing operations.

These and other objects of this invention will become apparent from a reading of the attached description together with the drawings wherein.

Figure 1:
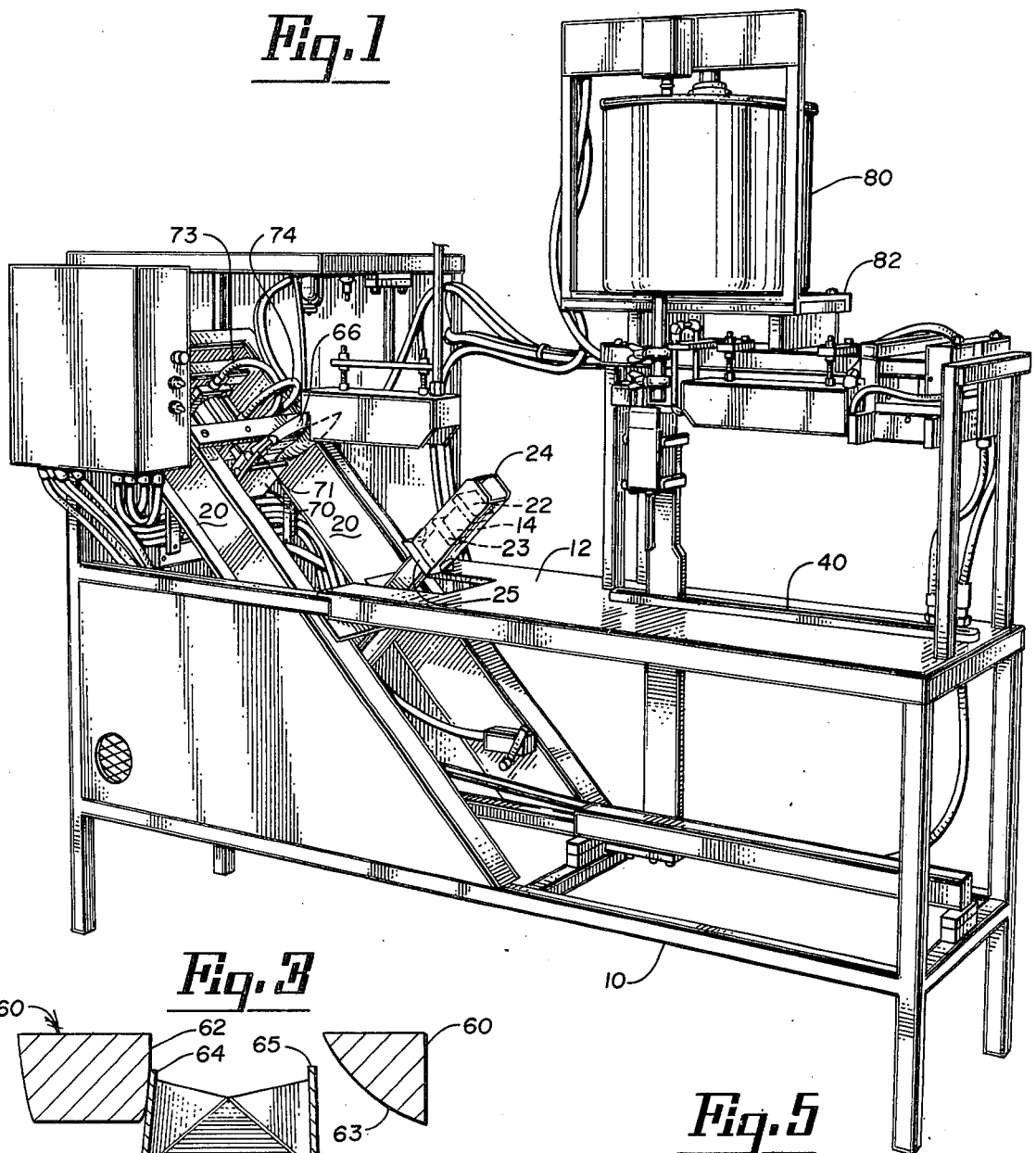
FIG. 1 is a perspective view of the improved carton forming, filling, and sealing machine.

The improved forming, filling, and sealing machine comprises a frame 10 with a tabletop 12 attached thereto. A mandrel 14 is attached to one end of an arm 16 which is mounted for pivotal movement about a shaft 18 which is supported by further frame members 20. Mandrel 14 is comprised of first and second portions 22 and 23 which have cross-sectional dimensions corresponding to the interior dimensions of the opened carton which is to be closed and sealed on the machine. In order to allow the operator to easily place the knocked-down carton blank 24 on mandrel 14, the body of the mandrel 14 is somewhat smaller than the portions 22 and 23. A further projecting portion 25 has a cross-sectional area along the axis of arm 16 which exceeds the cross section of opened carton 24 and acts as a stop to prevent further movement of carton 24 along mandrel 14 and arm 16 when the operator places a carton 24 over the mandrel 14.

The other end of arm 16 is pivotally connected to a piston 29 of a hydaulic piston and cylinder actuator 30 which receives its controlling hydraulic pressure through lines 32 and 33. When the hydraulic pressure applied to line 32 exceeds that of line 33, piston 29 is forced from piston and cylinder 30 and rotates arm 16 in a counterclockwise direction about shaft 18, as viewed in FIG. 2, moving mandrel 14 from the initial position shown in FIG. 2. Conventional hydraulic control means are utilized to move arm 16 from the initial position for receipt of a folded carton blank shown in bold lines in FIG. 2 to the position for heating the thermoplastic material of the carbon blank shown in ghost outline on FIG. 2 with arm 16 vertical. A third position of arm 16 is the other ghost-outlined position shown in FIG. 2 with arm 16 rotated further from the vertical and piston 29 fully extended from piston and cylinder unit 30. In order to allow for rotation of arm 16 from the initial position to the fully counterclockwise position, it is necessary to pivotally attach piston and cylinder unit 30 to frame 10.

The extreme end of arm 16 is pivotally connected by a link 35 to the bottom of a vertical member 37 which has a carton-supporting bracket 39 attached to its upper extension. Member 37 is located below the table 12 and projects through a slot 40 in the surface of the table. Member 37 is attached at its bottom edge to a slide block 41 which travels along a track 43 which is mounted on frame 10. When piston and cylinder 30 is actuated to rotate arm 16 to its vertical position, vertical member 37 is translated to the first position indicated on FIG. 2 in ghost outline to the right of the initial position. When arm 16 is fully rotated to its full counterclockwise position, link 35 couples that rotary motion to vertical member 37 to translate member 37 to the extreme righthand position indicated in ghost outline on FIG. 2. Thus, the motion of arm 16 and vertical member 37 are coordinated to provide synchronized motion of those members from the initial positions indicated in FIG. 2 to the two further positions indicated in ghost outline on FIG. 2 where the heating and sealing operations for the top and bottom closures of the carton are accomplished as described below.

BOTTOM CLOSING OPERATION

Figure 6:
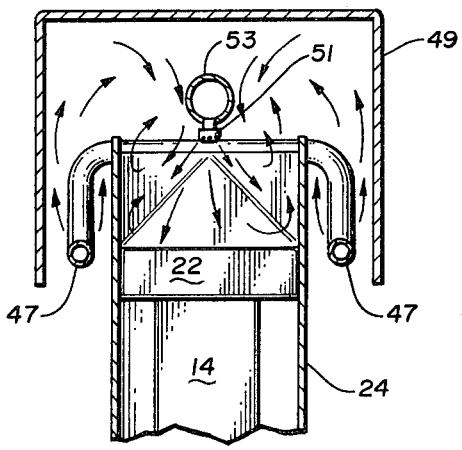
FIG. 6 is an enlarged sectional view of the bottom flap heating portion of improved forming, filling, and sealing machine taken along section lines 6—6 in FIG. 2.

The bottom of carton blank 24 projects above mandrel 14 and arm 16 when the operator uses mandrel 14 to manually open carton 24 and to support it while he breaks the bottom folds along the score lines. After he has placed opened carton 24 on mandrel 14 with the top of the carton firmly in place against stop 25, piston and cylinder 30 is actuated to move arm 16 to the vertical position illustrated in FIG. 2. In this position, the bottom portion of the carton is heated by electrical resistance heater units 47 which are also shown in FIG. 6. A metal shroud 49 encloses the heating elements 47 which are also shown in FIG. 6. A metal shroud 49 encloses the heating elements 47 and the top of the carton 24 to facilitate the heating of the carton. Heat is applied to the interior bottom walls of the carton by an air nozzle 51 which is connected into an air supply tube 53 which is connected to a supply of heated air. When the carton blank 24 is positioned between electrical heating elements 47 and heated air stream is directed from nozzle 51 into the bottom portion of carton blank 24, air convection streams are established between the heating elements 47 as shown by the arrows in FIG. 6. Thus, heated air from the electrical heating elements is also convected into the carton blank together with heated air from nozzle 51 to heat the interior as well as the exterior thermoplastic coatings to prepare them for the pressure sealing operation.

After the heating operation has been accomplished for the predetermined time interval necessary to precondition the thermoplastic coating of carton 24 to make an adequate seal when pressure is applied, piston and cylinder unit 30 is actuated to move arm 16 to the fully counterclockwise position for the pressure sealing operation. As arm 16 is rotated from the vertical position shown in ghost outline in FIG. 2 to the full counterclockwise position also shown in ghost outline in FIG. 2, the bottom portion of carton 24 is brought into contact with camming means 60 shown in FIG. 2 and in more detail in sectional views of FIGS. 3, 4, and 5. Camming means 60 is shown in perspective view in FIG. 1.

Figure 3:
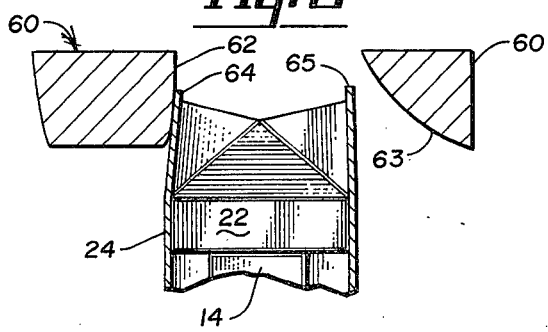
FIG. 3 is a sectional view of the bottom flap closing portion of the improved forming, filling, and sealing machine taken along section lines 3—3 in FIG. 2.
Figure 5:
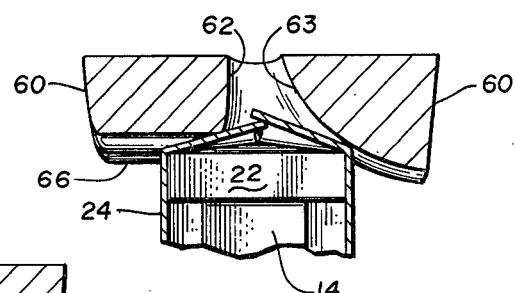
FIG. 5 is a sectional view of the bottom flap closing mechanism of the improved filling and sealing machine taken along the lines 5—5 in FIG. 2.
Figure 4:
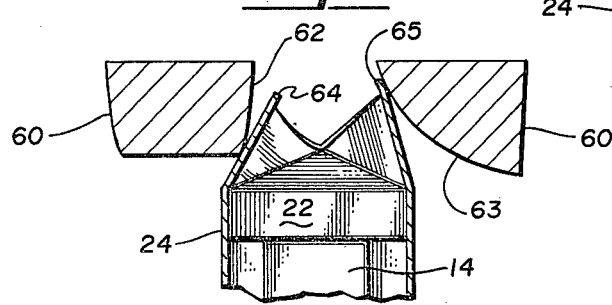
FIG. 4 is a sectional view of the bottom flap closing mechanism of FIGS. 1 and 2 taken along the lines 4—4 of FIG. 2.

FIGS. 3, 4, and 5 illustrate the sequence of bottom flap folding accomplished by the camming surfaces 62 and 63 of camming member 60 as arm 16 is progressably rotated in a counterclockwise direction about shaft 18 and carton 24 is moved from the heating position to the pressure applying position. As shown in FIG. 3, the camming surface 62 of camming member 60 applies a lateral pressure to one side flap 64 of carton blank 24 and begins to bend it upwardly. At the time that wall 64 begins to bend inwardly, the two adjacent walls also bend inwardly along the score lines, and the opposite wall 65 begins to move slightly inwardly as the folding of the two adjacent walls proceeds.

In FIG. 4, the carton 24 is shown folded further under the action of camming surface 62 of cam member 60 and the opposite wall of the carton is shown in contact with camming surface 63 of cam member 60 which provides a closing force normal to the axis of carton 24 and member 16. Finally, in FIG. 5, the bottom of carton 24 is shown substantially completely folded with the left portion 64 urged by surface 62 into a position below that of the righthand portion 65 as that portion is moved by surface 63.

When flap 64 is nearly closed, it receives a further closing pressure from the sharp transition between the lefthand portion of camming member 60 as shown in FIG. 5 and heel portion 66 which applies a closing force primarily along the axis of the carton rather than normal to the axis.

Figure 2:
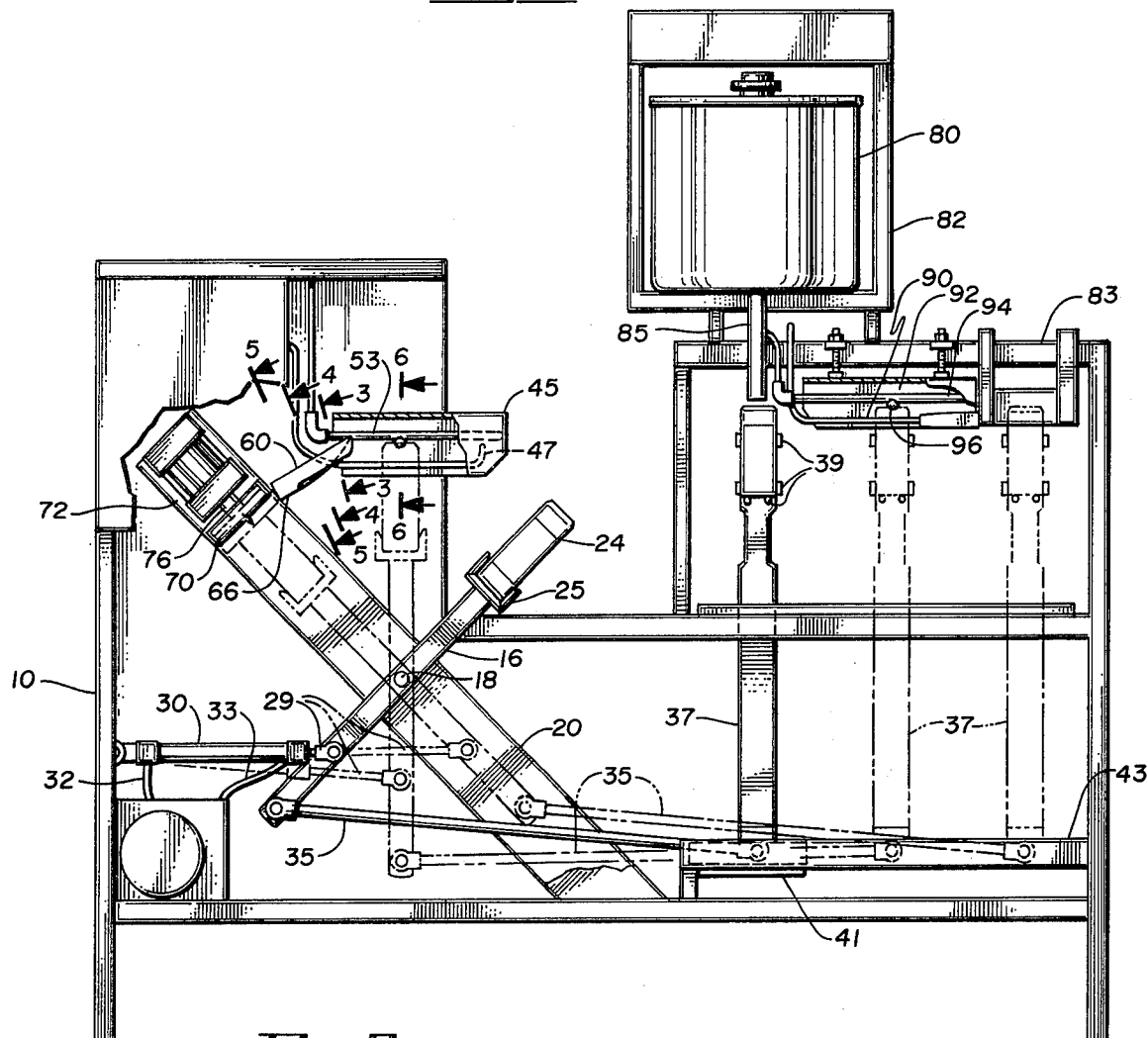
FIG. 2 is a front elevation view of the improved forming, filling, and sealing machine.

As arm 16 continues to rotate in a counterclockwise direction, the heel 66 of camming member 60 completes the closing of the bottom flaps with the lefthand flap (as viewed in FIGS. 3–5) being positioned below the righthand flap and inserted into the slot formed by the righthand flap and the folded portion of the sidewall of carton blank 24. As arm 16 is rotated counterclockwise from the position shown in FIG. 5 to its full counterclockwise position shown in ghost outline in FIG. 2, the bottom flaps 64 and 65 are maintained in place by pressure from the heel portion 66 of camming member 60 and by pressure applied by anvil 70 as shown in FIG. 2. As shown in FIG. 1, camming member 60 is supplied with heated fluid through conduit 71 to heat camming member 60 to keep the thermoplastic coating of carton 24 in a molten state.

Anvil 70 can be moved along the axis of support beams 20 and arm 16 when arm 16 is in its full counterclockwise position by action of piston and cylinder means 72 which is driven by hydraulic lines 73 and 74 to actuate piston shaft 76 to which avil 70 is attached. Anvil 70 is also heated by fluid from conduit 71. Actuation of piston and cylinder 72 to move anvil 70 along the axis of arm 16 toward shaft 18 applies heat and a sealing pressure to the closed flaps 64 and 65 of carton 24 to provide the bottom seal for the carton. After the closing pressure has been applied for a period of time sufficient to allow the heated thermoplastic coating to set, anvil 70 is retracted to the initial position and arm 16 is rotated by action of piston and cylinder 30 in a clockwise direction to the initial position shown on FIG. 2.

FILLING OF THE CARTON

After the bottom portion of carton 24 has been formed and sealed as described above, the operator manually removes the carton from mandrel 14 and inserts it in holding bracket 39 attached to vertical support member 37. At this point in the operation, vertical support member 37 is in the far left position shown in FIG. 2. It is while member 37 is in this position that the milk or other liquid is inserted into the container. The liquid is dispensed from a tank 80 which is supported by a frame 82 which is mounted on a further frame 83 which is attached to table 12 and frame 10. Tank 80 includes a dispensing valve 85 connected thereto for the purpose of dispensing fluid from the tank or reservoir 80 to the carton 24 to be filled. The tank is provided with a level-sensing means 87 to automatically control the height to which tank 80 is filled so that the filling of containers can be accomplished by controlling the time that the dispensing valve is opened rather than by a more complex method of directly measuring the actual amount of liquid contained in the carton 24 by level sensing or weighing techniques.

CLOSING AND SEALING OF TOP FLAPS

After the milk or other liquid has been dispensed from valve 85 into carton 24 and after the operator has placed a new carton blank on mandrel 14, piston and cylinder 30 is actuated to move arm 16 to the vertical position shown in ghost outline in FIG. 2 and to move vertical arm 37 to the intermediate position shown in FIG. 2 in ghost outline to the right of the initial position. In this location, the upper flaps of the carton are heated by electric heating rods 90 which are located within a housing 92. A heated air line 94 and a nozzle 96 direct heated air into the inner surfaces of the top of the carton in a manner analogous to that shown in FIG. 6 with regard to the operation of the bottom heating portion of the machine. After the top flaps of the filled carton have been heated and the bottom flaps of the succeeding carton have been heated, piston and cylinder 30 is actuated to the third position moving arm 16 to the full counterclockwise position and moving vertical support member 37 to the extreme righthand position shown in ghost outline on FIG. 2.

Figure 7:
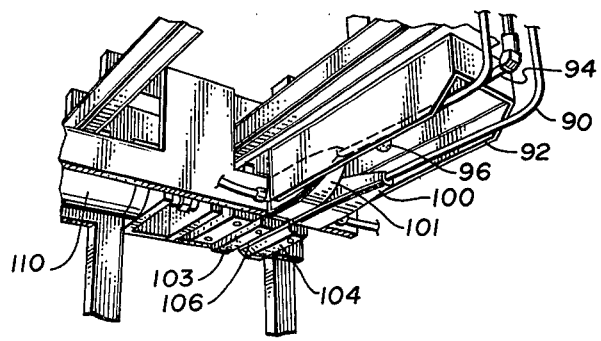
FIG. 7 is a perspective view of the top heating and closing mechanism of FIGS. 1 and 2.

As vertical support 37 is moved from the intermediate to full righthand position, the top flaps of carton 24 are closed by action of camming heated members 100 and 101 shown in FIG. 7 which force the flaps inwardly and downwardly into a gable top configuration. As the carton is moved to the final position, the flaps are held closed by movable jaws 103 and 104 which have a slot therebetween which accepts the top of the carton as vertical member 37 is moved into position. Movable members 103 and 104 are then pressed together by action of a further hydraulic piston and cylinder 110 which holds the flaps together to form the gable portion of the container until the thermoplastic material has set. Movable members 103 and 104 are heated by fluid supplied by conduits 107 shown in FIG. 7.

At the time that the top portion is being closed by piston and cylinder 110, the bottom seal is being formed on the next container by piston and cylinder 72. After completion of the seals, piston and cylinder 30 is actuated to retract piston 29 to the initial position shown in FIG. 2, and arm 16 and arm 37 are returned to the initial position shown in FIG. 2 for removal of the filled, sealed carton from clamp 39 of arm 37, for transfer by the operator of the carton with the formed and sealed bottom section from mandrel 14 and positioning of that carton in the holding means 39 of vertical support 37 for filling from filling valve 85 and for positioning of a new knocked-down carton blank on mandrel 24 so that the sealing and filling process can commence again.

In considering this invention, it should be remembered that the present disclosure is intended to be illustrative only, and the scope of the invention should be determined by the appended claims.

What is claimed is:

1. A machine for filling and sealing a tubular carton blank, comprising:
   (a) a frame structure;
   (b) a first member pivotally mounted on said frame structure including a mandrel mounted on one end of said first member, said mandrel being constructed and arranged to receive a knocked-down carton blank and also including drive means connected thereto for rotating said first member in one direction from an initial position to an intermediate position and a further position and in another direction back to said initial position;
   (c) a second member mounted on said frame for reciprocating translational movement along said frame including support means for holding a carton with a sealed bottom portion and an open top portion, said second member being coupled to a link coupled to said first member for movement from an initial position where the carton is filled with liquid to an intermediate and a further position, and back to said initial position in synchronism with said first member;
   (d) first and second heating means mounted on said frame adjacent said intermediate positions of said first and second members respectively for heating the respective bottom and top portions respectively of cartons carried by said first and second members between said initial and said further position;
   (e) first and second pressure applying means mounted on said frame in alignment with said further positions of said first and second members respectively including pressure means for applying pressure and heat for a predetermined period of time to seal the heated respective bottom and top portions of said carton.

2. Apparatus as claimed in claim 1 wherein each of said heating means comprises:

a shroud mounted on said frame;

radiant heating means positioned within said shroud for heating the outer surface of a carton blank positioned within said shroud said radiant heating means comprising a pair of rods parallel to the plane of rotation of said first member, said rods extending on both sides of said intermediate position to heat said case from the time it leaves said initial position until it reaches said further position; and means mounted within said shroud for directing a stream of heated air into the interior of said carton when said first and second members are in said intermediate position.

3. A machine for filling and sealing a carton blank, comprising:

(a) a frame structure;

(b) a first member pivotally mounted on said frame structure with one arm thereof above a pivot point on said frame and the other arm below the pivot point on said frame;

(c) a mandrel constructed and arranged to receive a knocked-down carton blank, said mandrel mounted on one arm of said first member;

(d) first drive means for rotating said first member from an initial position to an inermediate position a further position, and back to a first position;

(e) a second member mounted on said frame for translational movement along said frame;

(f) a third member pivotally connected to said second member and to the other arm of said first member to move said second member from an initial position to an intermediate and a final position and back to said initial position in synchronism with the movement of said first member;

(g) support means mounted on said second member for holding a carton with a sealed bottom portion and an open top portion to receive liquid when said second member is in said initial position and to support it while it is moved to an intermediate and a further position;

(h) first and second heating means mounted on said frame adjacent said intermediate positions of said first and second members respectively for heating the respective bottom and top portions respectively of cartons carried by said first and second members;

(i) first and second pressure applying means mounted on said frame in alingment with said further positions of said first and second members respectively including pressure means for applying pressure and heat for a predetermined period of time to seal the heated respective bottom and top portions of said carton.

4. The invention claimed in claim 3 wherein said first drive means is a linear actuator pivotally connected to said frame and an arm of said first member.

* * * * *